Jan. 14, 1958
O. E. HINKLE
2,819,616
MULTI-RANGE MANOMETER SYSTEM HAVING AN
AUTOMATIC SHUT-OFF VALVE
Filed Dec. 6, 1954
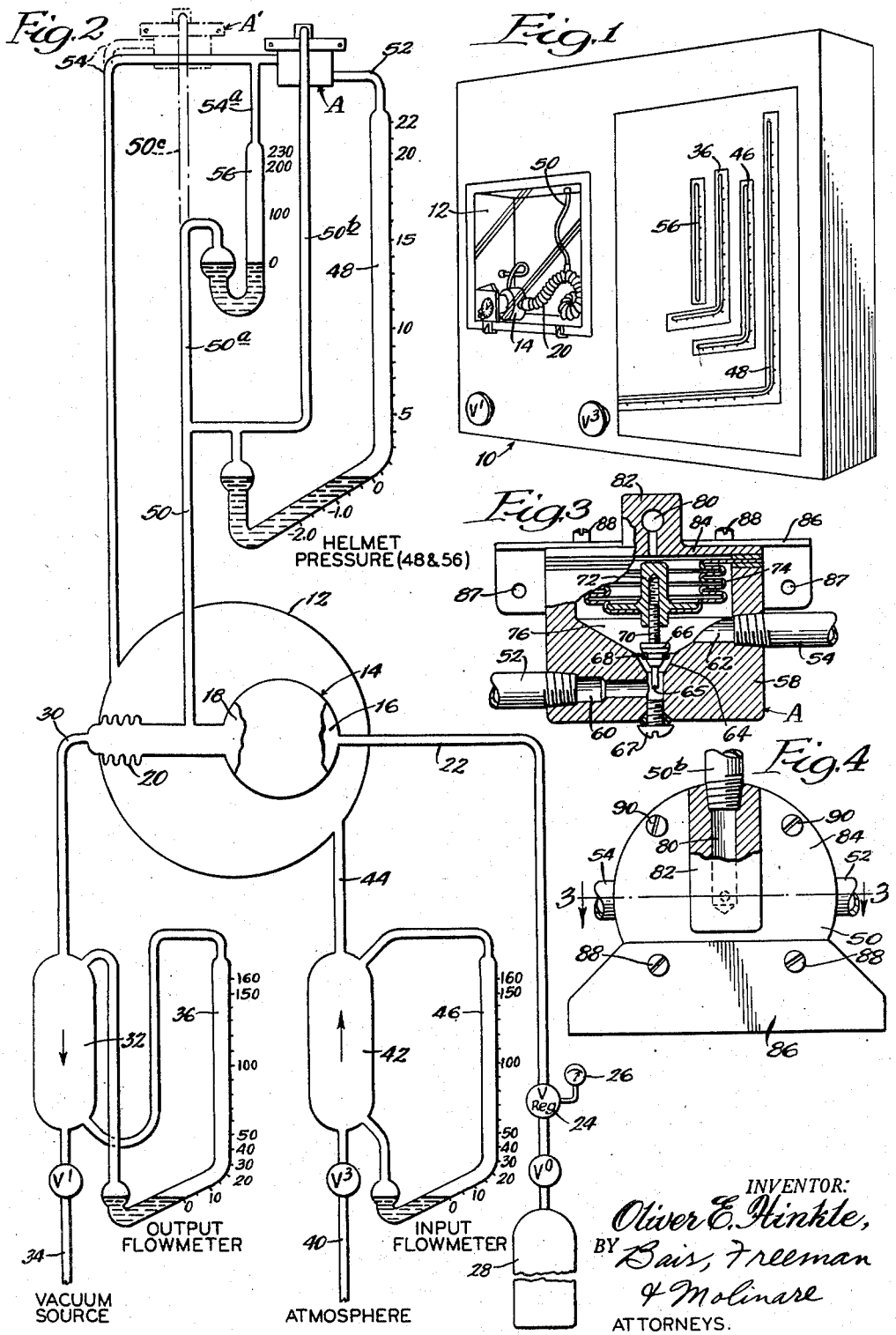
INVENTOR:
Oliver E. Hinkle,
BY Bair, Freeman
& Molinare
ATTORNEYS.

United States Patent Office
2,819,616
Patented Jan. 14, 1958

2,819,616

MULTI-RANGE MANOMETER SYSTEM HAVING AN AUTOMATIC SHUT-OFF VALVE

Oliver E. Hinkle, Bryan, Ohio, assignor to The Aro Equipment Corporation, Bryan, Ohio, a corporation of Ohio Application December 6, 1954, Serial No. 473,261

1 Claim. (Cl. 73—401)

This invention relates to an automatic shut-off valve system used in connection with manometers or similar pressure indicating devices and the like where it is desirable to protect the manometer against excessive pressure expelling the indicating fluid therefrom.

One object of the invention is to provide, in a system where low and high pressure manometers are connected in parallel, a means to prevent flow of the liquid from the low pressure manometer as the pressure in the system approaches the maximum reading of the low pressure manometer, the shut-off valve being so connected in the system that it does not interfere with the continued operation of the high pressure manometer after the low pressure manometer has been shut off by the shut-off valve.

Another object is to provide a valve of comparatively simple, inexpensive and durable construction that automatically operates in response to a predetermined pressure in a pressure producing system imposed on a manometer, to shut off the manometer from the pressure system, thus preventing outflow of the indicating liquid therefrom.

A further object is to provide a shut-off valve that operates automatically without the attention of the operator and which eliminates the use of floats for shut-off purposes and thereby eliminates the possibility of failure of such floats.

With these and other objects in view, my invention consists in the construction, arrangement and combination of the various parts of my automatic shut-off valve system, whereby the objects above contemplated are attained, as hereinafter more fully set forth, pointed out in my claim and illustrated in detail on the accompanying drawings, wherein:

Fig. 1 is a perspective view of a demand oxygen regulator test stand, including a manometer system to which my invention may be applied.

Fig. 2 is a diagrammatic view of the system showing my automatic shut-off valve therein.

Fig. 3 is an enlarged sectional view of the automatic shut-off valve; and

Fig. 4 is a top plan view thereof, the line 3—3 indicating where the section for Fig. 3 is taken.

On the accompanying drawing I have used the reference numeral 10 to indicate in general a demand oxygen regulator test stand. A stand of this character has a test chamber 12 in which an oxygen regulator 14 may be tested, the regulator being sealed in the chamber and capable of subjection to vacuum in the chamber surrounding the regulator. These regulators have an incoming high pressure chamber 16 and an outgoing demand chamber 18 (see Fig. 2) with a flexible connection 20 that is ordinarily plugged into the aviator's helmet whereby the helmet may receive oxygen or oxygen and air from the chamber 18, the oxygen under high pressure being supplied to the chamber 16 as from an oxygen cylinder 28. The supply of oxygen from the cylinder 28 is through a control valve $V^0$, a pressure regulator valve 24 and a pipe 22 entering the chamber 12 and discharging into the chamber 16. A pressure gauge 26 shows the pressure delivered by the pressure regulator valve 24 to the pipe 22. The delivered pressure may be varied by the proper adjustment of the valve 24. The oxygen is usually reduced in pressure before entering an intermediate chamber from which the oxygen is then metered to the chamber 18 by a demand valve operated by a demand diaphragm and thereby responsive to the inhalations of the aviator effective in the hose 20. A regulator of this character is described in the Deming Patent No. 2,403,508 of July 9, 1946, and forms no part of the present invention.

In order to make various tests on the oxygen regulator 14, a plurality of manometers 36, 46, 48 and 56 are located on the front panel of the test stand 10 as shown in Fig. 1, and as shown diagrammatically in Fig. 2, these are connected with the test chamber 12 and other elements of the test system which will now be described.

A "Vacuum Source" (so labeled) is connected by a pipe 34 and a valve $V^1$ to a pipe 30 that enters the hose 20. A flow can 32 is located in the pipe 30 and the flow therethrough is measured by the manometer 36 when the valve $V^1$ is open. The flow can resists the flow of air therethrough, being of the linear resistance type in which the pressure drop across the can when packed with glass wool or the like is a measure of the flow. The manometer 36 may be calibrated in liters per minute, for instance, the maximum being shown as 160, which is equivalent to about ten inches of water.

Pipes 40 and 44 and a valve $V^3$ admit atmospheric air to the chamber 12 when the valve $V^3$ is open. The flow through valve $V^3$ is measured by a flow can 42 and a manometer 46 comparable to the flow can 32 and the manometer 36. The manometers can thus be used as "Output Flowmeter" and "Input Flowmeter" (so labeled).

The manometer 48 constitutes a pressure-suction gauge and the manometer 56 a pressure gauge for "Helmet Pressure" (so labeled) in which a pressure connection 50 is provided with the chamber 18 of the oxygen regulator 14 and a vacuum connection 52—54 is provided with the test chamber 12. The manometer 48 is of low range type calibrated in inches of water with a maximum of approximately 22 inches, for example, and the manometer 56 is a mercury type for high pressure going up to 230 millimeters of mercury. The two are connected in parallel by the branch pipes 50a and 54a so as to secure a wide pressure range with small increments adjacent the zero reading on the manometer 48 and coarser increments above 22 inches of water or about .795 p. s. i. in the manometer. A reading of 22 on the manometer 48 is equivalent to a little above a reading of 41 millimeters of mercury on the manometer 56, the top reading on the manometer 56 being equivalent to approximately 4.4 p. s. i.

In the test system just described, I provide an automatic shut-off valve shown generally at A together with a branch connection 50b which I will soon describe. Disregarding the parts 50a and 50b, it will be obvious that if 52 and 54 are directly connected together, when the pressure differential between 20 and 12 through 50 and 52—54 exceeds a reading of 22, the indicating liquid in the manometer 48 will start flowing out of the manometer 48 through 52 and 54. Heretofore, a manual shut-off valve has been provided between 52 and 54 for the purpose of shutting off the manometer 48 for readings above 22 thereon and the pressure differential in 50a and 54a applied to the manometer 56 gives the higher pressure reading capable of a mercury manometer as distinguished from an oil hydrometer such as 36, 46 and 48 which use oils. These oils usually have a specific gravity between .8 and .9, which oil is usually colored red to show up better for reading purposes.

In order to eliminate the necessity of having to be careful about manually operating a shut-off valve as just described, and to eliminate the possibility of accidental overpressures being applied to the manometer 48, I provide the automatic shut-off valve A which requires no attention whatever and which will automatically shut off the passage from 52 to 54 when the pressure exceeds the maximum reading of the manometer 48. My automatic shut-off valve will now be described.

Referring to Figs. 3 and 4, a valve body 58 is provided with an inlet 60 and an outlet 62 for the pipes 52 and 54, respectively. A valve seat 64 is provided between the inlet 60 and the outlet 62 and a valve plug 66 is adapted to be seated thereon under the action of a pressure bellows 74. The bellows carries a hub 72 into which a stem 70 of the valve plug 66 is threaded. The valve plug is provided with an O-ring 68 for proper sealing in relation to the seat 64 and with a slot 65 for adjustment purposes (by means of a screwdriver). A closure plug 67 may be removed for access to the slot 65 when adjusting the setting of the shut-off valve A.

The interior of the bellows 74 is subjected to pressure from the pipe 50b which enters a passageway 80 in a boss 82 of a cover plate 84 that mounts the bellows 74 in the body 58. A bracket 86 serves to mount the body 58, being secured to the body by screws 88 that pass through the cover plate 84 and are threaded in the body. Additional screws 90 serve to hold the plate 84 in position on the body 58 with suitable gaskets interposed between the body, the plate and the mounting flange of the bellows 74 as shown in Fig. 3. The bracket 86 is perforated as at 87 for mounting on the back of the front panel of the test stand 10.

*Practical operation*

In the operation of the test stand 10, the oxygen regulator 14 to be tested is mounted in the chamber 12 and the proper connections at 22, 30 and 50 made. The flow meters 36 and 46 measure the output delivery of the regulator and the flow of air into the test chamber 12 which is the same as the air flow, less oxygen, through the regulator when the vacuum in the chamber is constant. The pressure-suction gauge (low range section 48 and high range section 56) is used to measure the various suctions required to obtain specified flows from the oxygen regulator and also the various pressures when testing positive pressure regulators or testing for leaks. The oxygen regulator 14 is controlled by an aneroid responsive to altitude and therefore the complete regulator must be tested under conditions which will actuate the aneroid. It is therefore necessary to supply the chamber 12 which can be evacuated to simulate flight altitude.

When the desired altitude has been attained by proper manipulations of the valves V¹ and V³, the amounts of air and oxygen must be measured; therefore, the two flowmeters 36 and 46 are provided. The Output Flowmeter measures the flow from the regulator outlet. The Input Flowmeter measures the flow of air coming into the chamber 12. For the Input Flowmeter to measure correctly the amount of air being drawn through the regulator the simulated altitude (negative pressure in chamber 12) must not be changing. Both flowmeters are measuring gas at a simulated altitude. When it is known how much air is being taken into the chamber 12 to maintain a given altitude and how much air and oxygen are being removed from the chamber, it is possible to compute the percentage of oxygen being delivered by the regulator at the test altitude.

The pressure-suction gauge 48 and the pressure gauge 56 measure the pressure or suction required to obtain the required flows from the regulator 14 at the various altitudes.

A considerable number of tests are possible with the system shown and I will refer to but a few of them in detail in order to show the importance of the automatic shut-off valve A in the system.

Normally the manometer 48 will measure helmet pressures during various tests from —2 inches of water up to several inches of water. If there is a leak in the oxygen regulator that runs the pressure in the chamber 12 above 22 inches of water, this pressure (about .8 p. s. i.) will close the O-ring 68 on the seat 64 so that the indicating fluid in the manometer 48 does not flow over into the pipes 52 and 54 and into the manometer 56. The setting of the automatic shut-off valve A of course for this purpose is .8 p. s. i., whereas the manometer may have a higher or lower reading and of course the valve A would be set accordingly (just above the last reading on the manometer). As the pressure goes on up, it is indicated on the high pressure range manometer 56 without damage having been done to the manometer 48 by loss of its fluid. When the pressure goes down again and is within the reading of the manometer 48 the valve A will open so that 48 will again function in the lower range, all without any attention from the operator. Obviously, higher range manometers may be connected in the system with automatic shut-off valves for protecting each one and where vacuum is being dealt with instead of pressure the automatic shut-off valve can be reversed in action accordingly.

Likewise, a shut-off valve A¹ may be interposed in the line 54 and connected at 50c (shown dotted in Fig. 2) to protect the manometer 56 against loss of its fluid, the valve A' being set for about 4.4 p. s. i. (for a reading of 230 millimeters of mercury).

Changes of the character suggested in the last two paragraphs, and others as well, may be made without departing from the spirit and purpose of my invention, and it is my intention to cover by my claim any modified forms of structure or use of mechanical equivalents which may reasonably be included within their scope.

I claim as my invention:

A multi-range manometer indicator system including a low range manometer and a higher range manometer connected in parallel, each having a high and a low pressure end, a first common pressure connection to both said high pressure ends, a second common pressure connection to both said low pressure ends, and a single automatic shut-off valve interposed in said second common pressure connection between said manometers having pressure responsive means separate from said manometers, said pressure responsive means actuating said shut-off valve element and being connected with said first common pressure connection to respond only to the pressure therein, said pressure responsive valve element being set at a pressure approximately equal to the capacity of said low range manometer to prevent flow of indicator fluid from the low range manometer into said second common pressure connection.

References Cited in the file of this patent
UNITED STATES PATENTS

| | | |
|---|---|---|
| 2,560,948 | Hannibal et al. | July 17, 1951 |
| 2,700,307 | Thoresen | Jan. 25, 1955 |

FOREIGN PATENTS

| | | |
|---|---|---|
| 15,241/1912 | Great Britain | June 26, 1913 |
| 396,819 | Germany | June 11, 1924 |